US008364851B2

(12) United States Patent
Kessler et al.

(10) Patent No.: US 8,364,851 B2
(45) Date of Patent: Jan. 29, 2013

(54) SCALABLE EFFICIENT I/O PORT PROTOCOL

(75) Inventors: Richard E. Kessler, Shrewsbury, MA (US); Samuel H. Duncan, Arlington, MA (US); David W. Hartwell, Bolton, MA (US); David A. J. Webb, Jr., Groton, MA (US); Steve Lang, Stow, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1891 days.

(21) Appl. No.: 10/677,583

(22) Filed: Oct. 2, 2003

(65) Prior Publication Data

US 2004/0073738 A1 Apr. 15, 2004

Related U.S. Application Data

(63) Continuation of application No. 09/652,391, filed on Aug. 31, 2000, now Pat. No. 6,738,836.

(51) Int. Cl.
*G06F 3/00* (2006.01)
(52) U.S. Cl. .......................................................... 710/1
(58) Field of Classification Search .............. 710/1, 104, 710/260; 711/120, 140–4
See application file for complete search history.

(56) References Cited

U.S. PATENT DOCUMENTS

| | | | | |
|---|---|---|---|---|
| 5,197,146 A | * | 3/1993 | LaFetra | 711/144 |
| 5,261,066 A | | 11/1993 | Jouppi et al. | 395/425 |
| 5,283,883 A | * | 2/1994 | Mishler | 710/33 |
| 5,317,718 A | | 5/1994 | Jouppi | 395/425 |
| 5,522,069 A | * | 5/1996 | Bertone et al. | 711/167 |
| 5,737,759 A | * | 4/1998 | Merchant | 711/146 |
| 5,758,183 A | | 5/1998 | Scales | 395/825 |
| 5,761,729 A | | 6/1998 | Scales | 711/148 |
| 5,778,437 A | | 7/1998 | Baylor et al. | 711/141 |
| 5,787,480 A | | 7/1998 | Scales et al. | 711/148 |
| 5,802,585 A | | 9/1998 | Scales et al. | 711/154 |
| 5,809,450 A | | 9/1998 | Chrysos et al. | 702/186 |

(Continued)

OTHER PUBLICATIONS

*Alpha Architecture Reference Manual*, Third Edition, The Alpha Architecture Committee, 1998 Digital Equipment Corporation (21 p.), in particular pp. 3-1 through 3-15.

(Continued)

*Primary Examiner* — Henry Tsai
*Assistant Examiner* — Aurangzeb Hassan

(57) ABSTRACT

A system that supports a high performance, scalable, and efficient I/O port protocol to connect to I/O devices is disclosed. A distributed multiprocessing computer system contains a number of processors each coupled to an I/O bridge ASIC implementing the I/O port protocol. One or more I/O devices are coupled to the I/O bridge ASIC, each I/O device capable of accessing machine resources in the computer system by transmitting and receiving message packets. Machine resources in the computer system include data blocks, registers and interrupt queues. Each processor in the computer system is coupled to a memory module capable of storing data blocks shared between the processors. Coherence of the shared data blocks in this shared memory system is maintained using a directory based coherence protocol. Coherence of data blocks transferred during I/O device read and write accesses is maintained using the same coherence protocol as for the memory system. Data blocks transferred during an I/O device read or write access may be buffered in a cache by the I/O bridge ASIC only if the I/O bridge ASIC has exclusive copies of the data blocks. The I/O bridge ASIC includes a DMA device that supports both in-order and out-of-order DMA read and write streams of data blocks. An in-order stream of reads of data blocks performed by the DMA device always results in the DMA device receiving coherent data blocks that do not have to be written back to the memory module.

1 Claim, 4 Drawing Sheets

U.S. PATENT DOCUMENTS

| | | | | |
|---|---|---|---|---|
| 5,848,434 | A * | 12/1998 | Young et al. | 711/144 |
| 5,875,151 | A | 2/1999 | Mick | 365/233 |
| 5,890,201 | A | 3/1999 | McLellan et al. | 711/108 |
| 5,893,931 | A | 4/1999 | Peng et al. | 711/206 |
| 5,918,250 | A | 6/1999 | Hammond | 711/205 |
| 5,918,251 | A | 6/1999 | Yamada et al. | 711/207 |
| 5,923,872 | A | 7/1999 | Chrysos et al. | 395/591 |
| 5,950,228 | A | 9/1999 | Scales et al. | 711/148 |
| 5,953,512 | A | 9/1999 | Cai et al. | 712/205 |
| 5,953,538 | A | 9/1999 | Duncan et al. | 395/842 |
| 5,964,867 | A | 10/1999 | Anderson et al. | 712/219 |
| 5,983,325 | A | 11/1999 | Lewchuk | 711/137 |
| 6,000,044 | A | 12/1999 | Chrysos et al. | 714/47 |
| 6,012,120 | A | 1/2000 | Duncan et al. | 710/129 |
| 6,026,461 | A | 2/2000 | Baxter et al. | 710/244 |
| 6,070,227 | A | 5/2000 | Rokicki | 711/117 |
| 6,085,300 | A | 7/2000 | Sunaga et al. | 711/168 |
| 6,205,508 | B1 * | 3/2001 | Bailey et al. | 710/260 |
| 6,314,477 | B1 * | 11/2001 | Cowger et al. | 710/22 |
| 6,338,123 | B2 | 1/2002 | Joseph et al. | 711/144 |
| 6,454,653 | B1 | 9/2002 | Kawazu | 463/43 |
| 6,647,469 | B1 * | 11/2003 | Sharma et al. | 711/147 |

OTHER PUBLICATIONS

*A Logic Design Structure for LSI Testability*, E. B. Eichelberger et al., 1977 IEEE (pp. 462-468).

*Direct RDRAM™ 256/288-Mbit (512Kx16/18x32s)*, Preliminary Information Document DL0060 Version 1.01 (69 p.).

*Testability Features of AMD-K6™ Microprocessor*, R. S. Fetherston et al., Advanced Micro Devices (8 p.).

*Hardware Fault Containment in Scalable Shared-Memory Multiprocessors*, D. Teodosiu et al., Computer Systems Laboratory, Stanford University (12 p.), 1977.

*Cellular Disco: resource management using virtual clusters on shared-memory multiprocessors*, K. Govil et al., 1999 ACM 1-58113-140-2/99/0012 (16 p.).

*Are Your PLDs Metastable?*, Cypress Semiconductor Corporation, Mar. 6, 1997 (19 p.).

*Rambus® RIMM™ Module (with 128/144Mb RDRAMs)*, Preliminary Information, Document DL0084 Version 1.1 (12 p.).

*Direct Rambus™ RIMM™ Module Specification Version 1.0*, Rambus Inc., SL-0006-100 (32 p.), 2000.

*End-To-End Fault Containment in Scalable Shared-Memory Multiprocessors*, D. Teodosiu, Jul. 2000 (148 p.).

\* cited by examiner

SCALABLE EFFICIENT I/O PORT PROTOCOL

"Apparatus And Method For Interfacing A High Speed Scan-Path With Slow-Speed Test Equipment," Ser. No. 09/653,642, filed Aug. 31, 2000; "Priority Rules For Reducing Network Message Routing Latency," Ser. No. 09/652,322, filed Aug. 31, 2000; "Scalable Directory Based Cache Coherence Protocol," Ser. No. 09/652,703, filed Aug. 31, 2000. "Efficient Translation Buffer Miss Processing For Applications Using Large Pages In Systems With A Large Range Of Page Sizes By Eliminating Page Table Level," Ser. No. 09/652,552, filed Aug. 31, 2000; "Fault Containment And Error Recovery Techniques In A Scalable Multiprocessor," Ser. No. 09/651,949, filed Aug. 31, 2000; "Speculative Directory Writes In A Directory Based CC-Non Uniform Memory Access Protocol," Ser. No. 09/652,834, filed Aug. 31, 2000; "Special Encoding Of Known Bad Data," Ser. No. 09/652,834, filed Aug. 31, 2000; "Broadcast Invalidate Scheme," Ser. No. 09/652,165, filed Aug. 31, 2000; "Mechanism To Track Keep-All Pages Open In A DRAM Memory System," Ser. No. 09/652,704, filed Aug. 31, 2000; "Programmable DRAM Address Mapping Mechanism," Ser. No. 09/653,093, filed Aug. 31, 2000; "Computer Architecture and System For Efficient Management of Bi-Directional Bus," Ser. No. 09/652,232, filed Aug. 31, 2000; "An Efficient Address Interleaving With Simultaneous Multiple Locality Options," Ser. No. 09/652,452, filed Aug. 31, 2000; "A High Performance Way Allocation Strategy For A Multi-Way Associative Cache System," Ser. No. 09/653,092, filed Aug. 31, 2000; "Method And System For Absorbing Defects In High Performance Microprocessor With A Large N-Way Set Associative Cache," Ser. No. 09/651,948, filed Aug. 31, 2000; "A Method For Reducing Directory Writes And Latency In A High Performance, Directory-Based, Coherency Protocol," Ser. No. 09/652,324, filed Aug. 31, 2000; "Mechanism To Reorder Memory Read And Write Transactions For Reduced Latency And Increased Bandwidth," Ser. No. 09/653,094, filed Aug. 31, 2000; "System For Minimizing Memory Bank Conflicts In A Computer System," Ser. No. 09/652,325, filed Aug. 31, 2000; "Computer Resource Management And Allocation System," Ser. No. 09/651,945, filed Aug. 31, 2000; "Input Data Recovery Scheme," Ser. No. 09/653,643, filed Aug. 31, 2000; "Fast Lane Prefetching," Ser. No. 09/652,451, filed Aug. 31, 2000; "Mechanism For Synchronizing Multiple Skewed Source-Synchronous Data Channels With Automatic Initialization Feature," Ser. No. 09/652,480, filed Aug. 31, 2000; "Mechanism To Control The Allocation Of An N-Source Shared Buffer," Ser. No. 09/651,924, filed Aug. 31, 2000; and "Chaining Directory Reads And Writes To Reduce DRAM Bandwidth In A Directory Based CC-NUMA Protocol," Ser. No. 09/652,315 filed Aug. 31, 2000, all of which are incorporated by reference herein.

Further, this specification is a continuation of application Ser. No. 09/652,391 filed Aug. 31, 2000 now U.S. Pat. No. 6,738,836, title "Scalable Efficient I/O Port Protocol."

STATEMENT REGARDING FEDERALLY SPONSORED RESEARCH OR DEVELOPMENT

Not applicable.

CROSS-REFERENCE TO RELATED APPLICATIONS

This application relates to the following commonly assigned co-pending applications entitled:

BACKGROUND OF THE INVENTION

1. Field of the Invention

The present invention generally relates to a computer system with multiple processors. More particularly, the invention relates to a distributed shared memory multiprocessing computer system that supports a high performance, scalable and efficient input/output ("I/O") port protocol to connect to I/O devices.

2. Background of the Invention

Distributed computer systems typically comprise multiple computers connected to each other by a communications network. In some distributed computer systems, networked computers can access shared data. Such systems are sometimes known as parallel computers. If a large number of computers are networked, the distributed system is considered to be "massively" parallel. One advantage of a massively parallel computer is that it can solve complex computational problems in a reasonable amount of time.

In such systems, the memories of the computers are collectively known as a Distributed Shared Memory ("DSM"). It is a problem to ensure that the data stored in the DSM is accessed in a coherent manner. Coherency, in part, means that only one processor can modify any part of the data at any one time, otherwise the state of the system would be nondeterministic.

Recently, DSM systems have been built as a cluster of Symmetric Multiprocessors ("SMP"). In SMP systems, shared memory can be implemented efficiently in hardware since the processors are symmetric (e.g., identical in construction and in operation) and operate on a single, shared processor bus. Symmetric multiprocessor systems have good price/performance ratios with four or eight processors. However, because of the specially designed bus that makes message passing between the processors a bottleneck, it is difficult to scale the size of an SMP system beyond twelve or sixteen processors.

It is desired to construct large-scale DSM systems using processors connected by a network. The goal is to allow processors to efficiently share the memories so that data fetched by one program executed on a first processor from memory attached to a second processor is immediately available to all processors.

DSM systems function by using message passing to maintain the coherency of the shared memory distributed throughout the multiprocessing computer system. A message is composed of packets that contain identification information and data. Control of message routing is distributed throughout the system and each processor visited by a message traveling through the multiprocessing computer system controls the routing of the message through it. Message passing can reduce system performance since delays in transmission of message packets can slow down program execution. Delays in transmission can occur because of high latency due to congestion in the network (i.e., many messages trying to go through the limited physical connections of the networks). This type of congestion can cause tremendous performance degradation that can result in high overall program execution times.

Each processor of a distributed shared memory computer system typically connects to an I/O bridge/Bus Interface ASIC (referred to as "I/O bridge ASIC") that permits the processor to gain access to input or output devices. Such devices may be keyboards, monitors, disk drives, hard drives, CD-ROM, tape backup systems, and a host of other peripheral I/O devices. The processor typically implements an I/O port protocol that interfaces the processor to the external I/O device through the I/O bridge ASIC. The I/O port protocol performs many operations between the processor and external I/O devices across the I/O bridge ASIC. These operations include direct memory access ("DMA") read streams, DMA write streams, processor access to I/O devices, I/O device interrupt handling, coherence for I/O translation lookaside buffers ("TLB"), and peer-to-peer I/O communication between two different I/O devices.

Although prior art I/O port protocols used between processors and their I/O bridge ASICs have been suitable for single processor computer systems or twelve to sixteen node single bus SMP systems, these I/O port protocols lacked the ability to allow efficient and fast I/O port operations for a scalable DSM multiprocessing computer system. DSM computer systems which used the computer systems internal bus protocol could not take advantage of the memory and cache coherence protocols because of implementation differences between the internal bus protocol and coherence protocol. Thus, an I/O access required translation between the two protocols resulting in complex translation hardware, increased implementation cost and reduced computer system performance. Therefore, it is desired to implement an I/O port protocol compatible with a DSM computer system memory and cache coherence protocol that permits I/O port operations to take place in the DSM computer system efficiently, quickly and easily while maintaining the coherency of the data accessed by I/O port devices.

BRIEF SUMMARY OF THE INVENTION

The problems noted above are solved in large part by a distributed multiprocessing computer system that includes a plurality of processors each coupled to an I/O bridge ASIC implementing an I/O port protocol. One or more I/O devices are coupled to the I/O bridge ASIC, each I/O device capable of accessing machine resources in the computer system by transmitting and receiving message packets. Machine resources in the computer system include data blocks, registers and interrupt queues. Each processor in the computer system is coupled to a memory module capable of storing data blocks shared between the processors. Coherence of the shared data blocks in this shared memory system is maintained using a directory based coherence protocol. Coherence of data blocks transferred during I/O device access to machine resources is maintained using the same coherence protocol as for the memory system. Data blocks transferred during an I/O device read or write access may be buffered by the I/O bridge ASIC only if the I/O bridge ASIC has exclusive copies of the data blocks.

The I/O bridge ASIC includes a DMA device that supports both in-order and out-of-order DMA read and write streams of data blocks. An in-order stream of reads of data blocks performed by the DMA device using coherence memory barriers between each read ensures a certain level of memory consistency such that the DMA device receives coherent data blocks that do not have to be written back to the memory module.

In the distributed multiprocessing computer system, I/O devices can generate interrupts by writing to an interrupt queue in a destination processor. The write of the interrupt queue in the destination processor is implemented by sending message packets containing an interrupt through the bridge logic device and intermediate processors to the interrupt queue in the destination processor.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
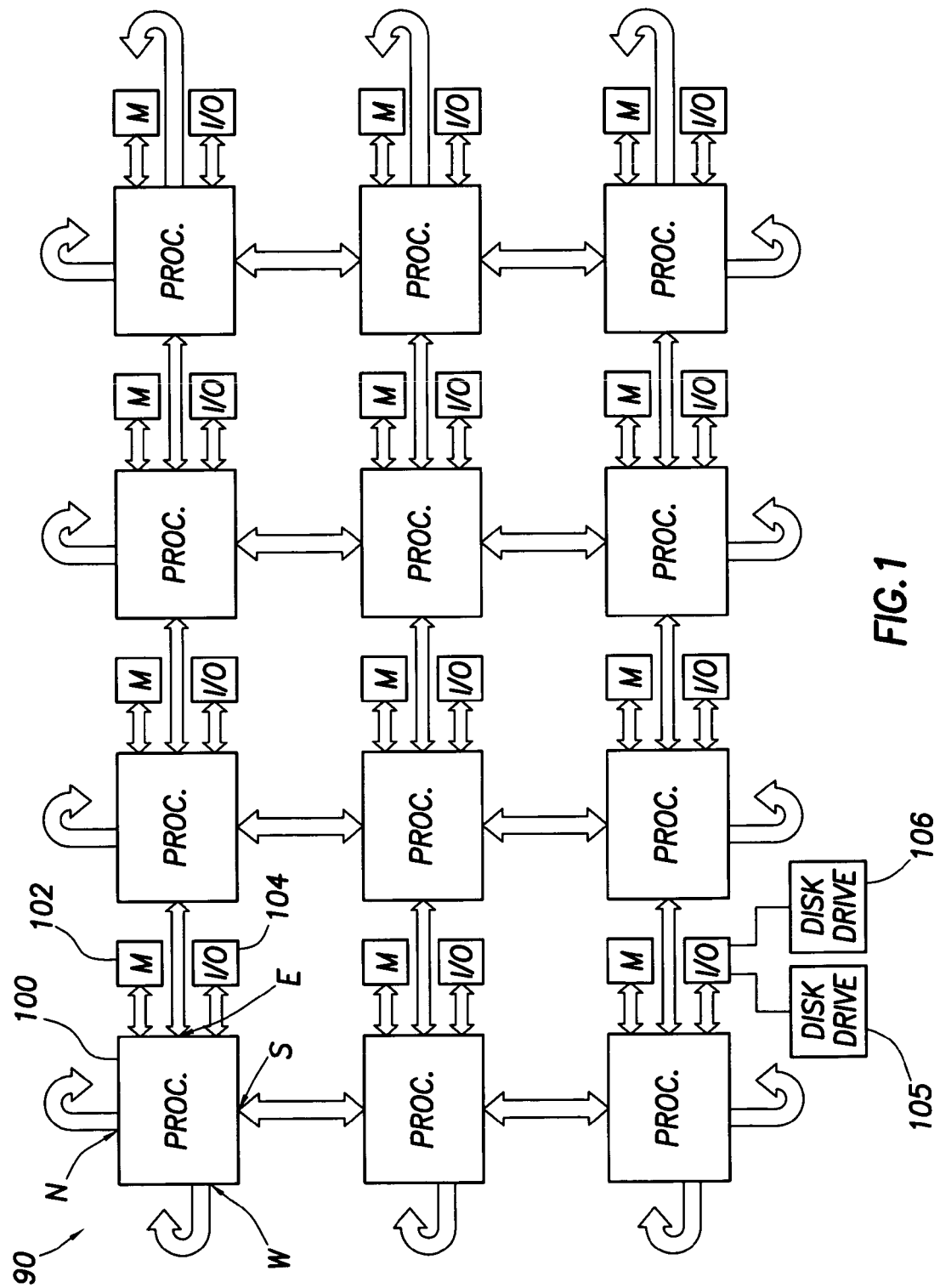
FIG. 1 shows a system diagram of a plurality of processors coupled together.

Referring now to FIG. 1, in accordance with the preferred embodiment of the invention, computer system 90 comprises one or more processors 100 coupled to a memory 102 and an input/output ("I/O") controller 104. As shown, computer system 90 includes twelve processors 100, each processor coupled to a memory and an I/O controller. Each processor preferably includes four ports for connection to adjacent processors. The interprocessor ports are designated "North," "South," "East," and "West" in accordance with the well-known Manhattan grid architecture. As such, each processor 100 can be connected to four other processors. The processors on both ends of the system layout wrap around and connect to processors on the opposite side to implement a 2D torus-type connection. Although twelve processors 100 are shown in the exemplary embodiment of FIG. 1, any desired number of processors (e.g., 256) can be included. For purposes of the following discussion, the processor in the upper, left-hand corner of FIG. 1 will be discussed with the understanding that the other processors 100 are similarly configured in the preferred embodiment.

As noted, each processor preferably has an associated I/O controller 104. The I/O controller 104 provides an interface to various input/output devices such as disk drives 105 and 106, as shown in the lower, left-hand corner of FIG. 1. Data from the I/O devices thus enters the 2D torus via the I/O controllers.

Each processor also, preferably, has an associated memory 102. In accordance with the preferred embodiment, the memory 102 preferably comprises RAMbus™ memory devices, but other types of memory devices can be used, if desired. The capacity of the memory devices 102 can be any suitable size. Further, memory devices 102 preferably are implemented as Rambus Interface Memory Modules ("RIMM").

In general, computer system 90 can be configured so that any processor 100 can access its own memory 102 and I/O devices, as well as the memory and I/O devices of all other processors in the system. Preferably, the computer system may have physical connections between each processor resulting in low interprocessor communication times and improved memory and I/O device access reliability. If physical connections are not present between each pair of processors, a pass-through or bypass path is preferably implemented in each processor that permits accesses to a processor's memory and I/O devices by another processor through one or more pass-through processors.

Figure 2A:
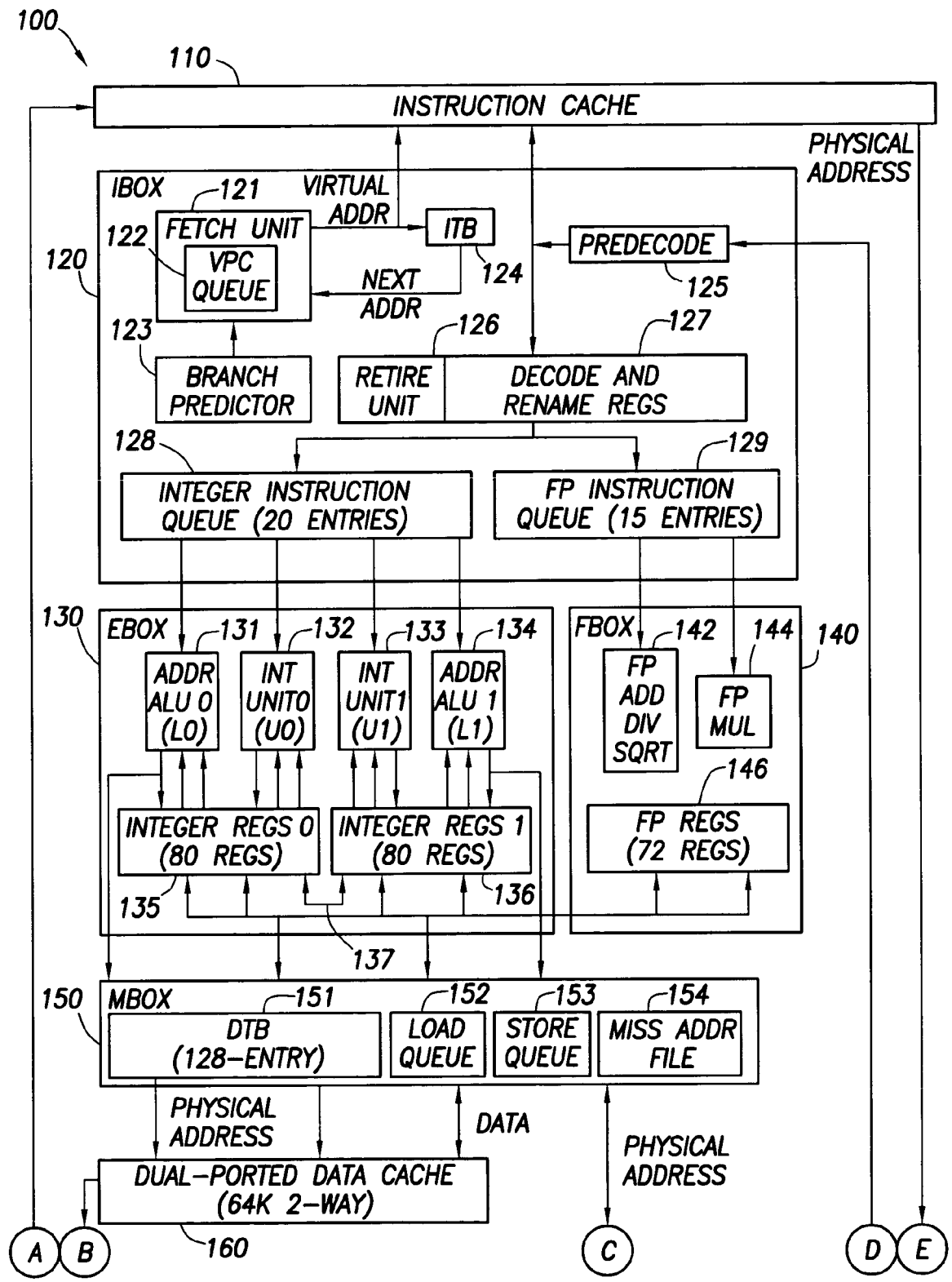
FIGS. 2a and 2b show a block diagram of the processors of FIG. 1.
Figure 2B:
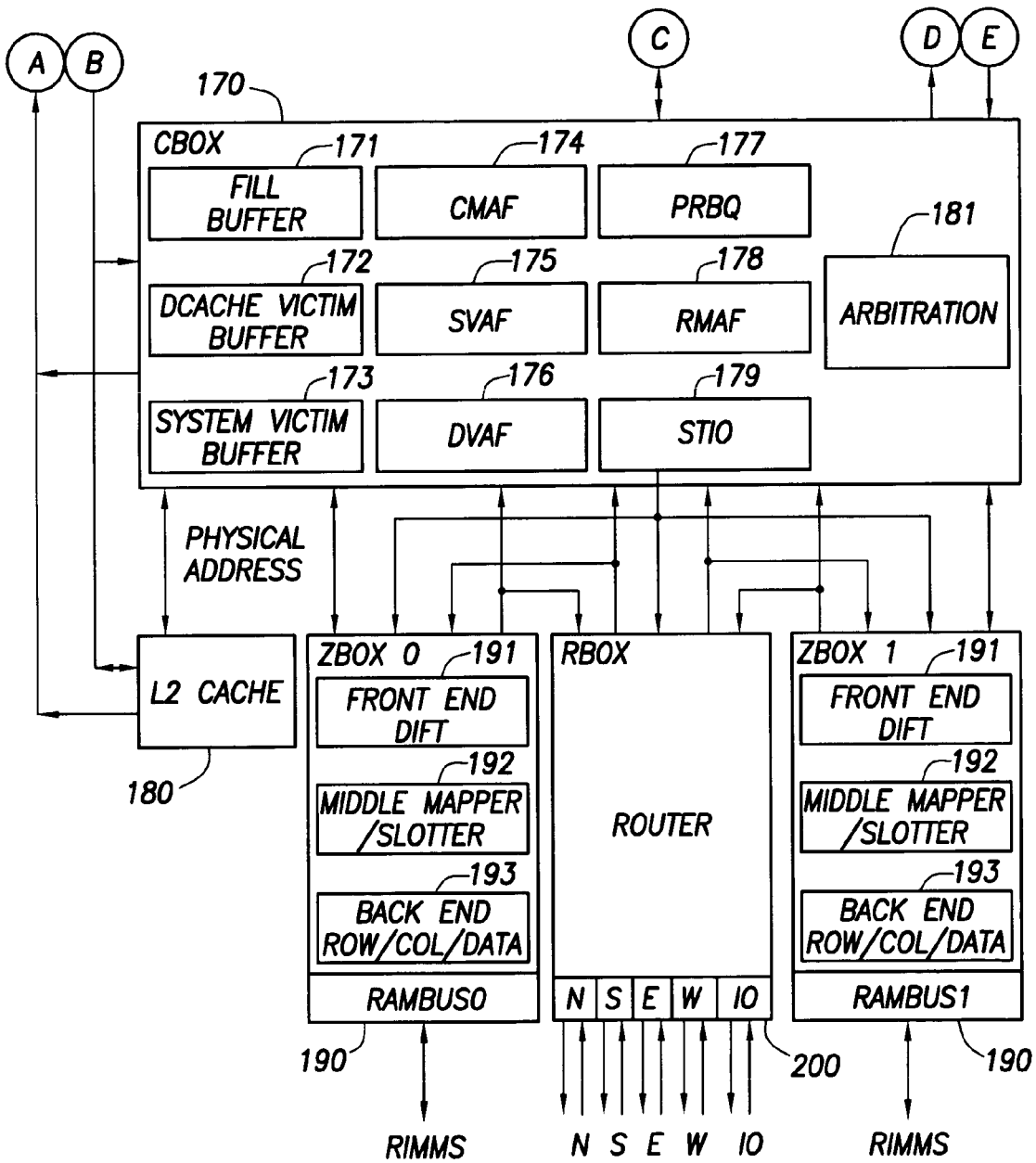

Referring now to FIGS. 2a and 2b, each processor 100 preferably includes an instruction cache 110, an instruction fetch, issue and retire unit ("Ibox") 120, an integer execution unit ("Ebox") 130, a floating-point execution unit ("Fbox") 140, a memory reference unit ("Mbox") 150, a data cache 160, an L2 instruction and data cache control unit ("Cbox") 170, a level L2 cache 180, two memory controllers ("Zbox0" and "Zbox1") 190, and an interprocessor and I/O router unit ("Rbox") 200. The following discussion describes each of these units.

Each of the various functional units 110-200 contains control logic that communicates with the control logic of various other functional units, control logic as shown. The instruction cache control logic 110 communicates with the Ibox 120, Cbox 170, and L2 Cache 180. In addition to the control logic communicating with the instruction cache 110, the Ibox control logic 120 communicates with Ebox 130, Fbox 140 and Cbox 170. The Ebox 130 and Fbox 140 control logic both communicate with the Mbox 150, which in turn communicates with the data cache 160 and Cbox 170. The Cbox control logic also communicates with the L2 cache 180, Zboxes 190, and Rbox 200.

Referring still to FIGS. 2a and 2b, the Ibox 120 preferably includes a fetch unit 121 which contains a virtual program counter ("VPC") 122, a branch predictor 123, an instruction-stream translation buffer 124, an instruction predecoder 125, a retire unit 126, decode and rename registers 127, an integer instruction queue 128, and a floating point instruction queue 129. Generally, the VPC 122 maintains virtual addresses for instructions that are in flight. An instruction is said to be "in-flight" from the time it is fetched until it retires or aborts. The Ibox 120 can accommodate as many as 80 instructions, in 20 successive fetch slots, in flight between the decode and rename registers 127 and the end of the pipeline. The VPC preferably includes a 20-entry table to store these fetched VPC addresses.

With regard to branch instructions, the Ibox 120 uses the branch predictor 123. A branch instruction requires program execution either to continue with the instruction immediately following the branch instruction if a certain condition is met, or branch to a different instruction if the particular condition is not met. Accordingly, the outcome of a branch instruction is not known until the instruction is executed. In a pipelined architecture, a branch instruction (or any instruction for that matter) may not be executed for at least several, and perhaps many, clock cycles after the fetch unit in the processor fetches the branch instruction. In order to keep the pipeline full, which is desirable for efficient operation, the processor includes branch prediction logic that predicts the outcome of a branch instruction before it is actually executed (also referred to as "speculating"). The branch predictor 123, which receives addresses from the VPC queue 122, preferably bases its speculation on short and long-term history of prior instruction branches. As such, using branch prediction logic, a processor's fetch unit can speculate the outcome of a branch instruction before it is actually executed. The speculation, however, may or may not turn out to be accurate. That is, the branch predictor logic may guess wrong regarding the direction of program execution following a branch instruction. If the speculation proves to have been accurate, which is determined when the processor executes the branch instruction, then the next instructions to be executed have already been fetched and are working their way through the pipeline.

If, however, the branch speculation performed by the branch predictor 123 turns out to have been the wrong prediction (referred to as "misprediction" or "misspeculation"), many or all of the instructions behind the branch instruction may have to be flushed from the pipeline (i.e., not executed) because of the incorrect fork taken after the branch instruction. Branch predictor 123 uses any suitable branch prediction algorithm, however, that results in correct speculations more often than misspeculations, and the overall performance of the processor is better (even in the face of some misspeculations) than if speculation was turned off.

The instruction translation buffer ("ITB") 124 couples to the instruction cache 110 and the fetch unit 121. The ITB 124 comprises a 128-entry, fully associative instruction-stream translation buffer that is used to store recently used instruction-stream address translations and page protection information. Preferably, each of the entries in the ITB 124 may be 1, 8, 64 or 512 contiguous 8-kilobyte (KB) pages or 1, 32, 512, 8192 contiguous 64-kilobyte pages. The allocation scheme used for the ITB 124 is a round-robin scheme, although other schemes can be used as desired.

The predecoder 125 reads an octaword (16 contiguous bytes) from the instruction cache 110. Each octaword read from instruction cache may contain up to four naturally aligned instructions per cycle. Branch prediction and line prediction bits accompany the four instructions fetched by the predecoder 125. The branch prediction scheme implemented in branch predictor 123 generally works most efficiently when only one branch instruction is contained among the four fetched instructions. The predecoder 125 predicts the instruction cache line that the branch predictor 123 will generate. The predecoder 125 generates fetch requests for additional instruction cache lines and stores the instruction stream data in the instruction cache.

Referring still to FIGS. 2a and 2b, the retire unit 126 fetches instructions in program order, executes them out of order, and then retires (also called "committing" an instruction) them in order. The Ibox 120 logic maintains the architectural state of the processor by retiring an instruction only if all previous instructions have executed without generating exceptions or branch mispredictions. An exception is any event that causes suspension of normal instruction execution. Retiring an instruction commits the processor to any changes that the instruction may have made to the software accessible registers and memory. The processor 100 preferably includes the following three machine code accessible hardware: integer and floating-point registers, memory, internal processor registers. The retire unit 126 of the preferred embodiment can retire instructions at a sustained rate of eight instructions per cycle, and can retire as many as 11 instructions in a single cycle.

The decode and rename registers 127 contains logic that forwards instructions to the integer and floating-point instruction queues 128, 129. The decode and rename registers 127 perform preferably the following two functions. First, the decode and rename registers 127 eliminates register write-after-read ("WAR") and write-after-write ("WAW") data dependency while preserving true read-after-write ("RAW") data dependencies. This permits instructions to be dynamically rescheduled. Second, the decode and rename registers 127 permits the processor to speculatively execute instructions before the control flow previous to those instructions is resolved.

The logic in the decode and rename registers 127 preferably translates each instruction's operand register specifiers from the virtual register numbers in the instruction to the physical register numbers that hold the corresponding architecturally-correct values. The logic also renames each instruction destination register specifier from the virtual number in the instruction to a physical register number chosen from a list of free physical registers, and updates the register maps. The decode and rename register logic can process four instructions per cycle. Preferably, the logic in the decode and rename registers 127 does not return the physical register, which holds the old value of an instruction's virtual destination register, to the free list until the instruction has been retired, indicating that the control flow up to that instruction has been resolved.

If a branch misprediction or exception occurs, the register logic backs up the contents of the integer and floating-point rename registers to the state associated with the instruction that triggered the condition, and the fetch unit 121 restarts at the appropriate Virtual Program Counter ("VPC"). Preferably, as noted above, twenty valid fetch slots containing up to eighty instructions can be in flight between the registers 127 and the end of the processor's pipeline, where control flow is finally resolved. The register 127 logic is capable of backing up the contents of the registers to the state associated with any of these 80 instructions in a single cycle. The register logic 127 preferably places instructions into the integer or floating-point issue queues 128, 129, from which they are later issued to functional units 130 or 136 for execution.

The integer instruction queue 128 preferably includes capacity for twenty integer instructions. The integer instruction queue 128 issues instructions at a maximum rate of four instructions per cycle. The specific types of instructions processed through queue 128 include: integer operate commands, integer conditional branches, unconditional branches (both displacement and memory formats), integer and floating-point load and store commands, Privileged Architecture Library ("PAL") reserved instructions, integer-to-floating-point and floating-point-integer conversion commands.

Referring still to FIGS. 2a and 2b, the integer execution unit ("Ebox") 130 includes arithmetic logic units ("ALUs") 131, 132, 133, and 134 and two integer register files 135. Ebox 130 preferably comprises a 4-path integer execution unit that is implemented as two functional-unit "clusters" labeled 0 and 1. Each cluster contains a copy of an 80-entry, physical-register file and two subclusters, named upper ("U") and lower ("L"). As such, the subclusters 131-134 are labeled U0, L0, U1, and L1. Bus 137 provides cross-cluster communication for moving integer result values between the clusters.

The subclusters 131-134 include various components that are not specifically shown in FIG. 2a. For example, the subclusters preferably include four 64-bit adders that are used to calculate results for integer add instructions, logic units, barrel shifters and associated byte logic, conditional branch logic, a pipelined multiplier for integer multiply operations, and other components known to those of ordinary skill in the art.

Each entry in the integer instruction queue 128 preferably asserts four request signals—one for each of the Ebox 130 subclusters 131, 132, 133, and 134. A queue entry asserts a request when it contains an instruction that can be executed by the subcluster, if the instruction's operand register values are available within the subcluster. The integer instruction queue 128 includes two arbiters—one for the upper subclusters 132 and 133 and another arbiter for the lower subclusters 131 and 134. Each arbiter selects two of the possible twenty requesters for service each cycle. Preferably, the integer instruction queue 128 arbiters choose between simultaneous requesters of a subcluster based on the age of the request—older requests are given priority over newer requests. If a given instruction requests both lower subclusters, and no older instruction requests a lower subcluster, then the arbiter preferably assigns subcluster 131 to the instruction. If a given instruction requests both upper subclusters, and no older instruction requests an upper subcluster, then the arbiter preferably assigns subcluster 133 to the instruction.

The floating-point instruction queue 129 preferably comprises a 15-entry queue and issues the following types of instructions: floating-point operates, floating-point conditional branches, floating-point stores, and floating-point register to integer register transfers. Each queue entry preferably includes three request lines—one for the add pipeline, one for the multiply pipeline, and one for the two store pipelines. The floating-point instruction queue 129 includes three arbiters—one for each of the add, multiply, and store pipelines. The add and multiply arbiters select one requester per cycle, while the store pipeline arbiter selects two requesters per cycle, one for each store pipeline. As with the integer instruction queue 128 arbiters, the floating-point instruction queue arbiters select between simultaneous requesters of a pipeline based on the age of the request—older request are given priority. Preferably, floating-point store instructions and floating-point register to integer register transfer instructions in even numbered queue entries arbitrate for one store port. Floating-point store instructions and floating-point register to integer register transfer instructions in odd numbered queue entries arbitrate for the second store port.

Floating-point store instructions and floating-point register-to-integer-register transfer instructions are queued in both the integer and floating-point queues. These instructions wait in the floating-point queue until their operand register values are available from the floating-point execution unit ("Fbox") registers. The processor executing these instructions subsequently requests service from the store arbiter. Upon being issued from the floating-point queue 129, the processor executing these instructions signal the corresponding entry in the integer queue 128 to request service. Finally, the operation is complete after the instruction is issued from the integer queue 128.

The integer registers 135, 136 preferably contain storage for the processor's integer registers, results written by instructions that have not yet been retired, and other information as desired. The two register files 135, 136 preferably contain identical values. Each register file preferably includes four read ports and six write ports. The four read ports are used to source operands to each of the two subclusters within a cluster. The six write ports are used to write results generated within the cluster or another cluster and to write results from load instructions.

The floating-point execution queue ("Fbox") 129 contains a floating-point add, divide and square-root calculation unit 142, a floating-point multiply unit 144 and a register file 146. Floating-point add, divide and square root operations are handled by the floating-point add, divide and square root calculation unit 142 while floating-point operations are handled by the multiply unit 144.

The register file 146 preferably provides storage for seventy-two entries including thirty-one floating-point registers and forty-one values written by instructions that have not yet been retired. The Fbox register file 146 contains six read ports and four write ports (not specifically shown). Four read ports are used to source operands to the add and multiply pipelines, and two read ports are used to source data for store instructions. Two write ports are used to write results generated by the add and multiply pipelines, and two write ports are used to write results from floating-point load instructions.

Referring still to FIG. 2a, the Mbox 150 controls the L1 data cache 160 and ensures architecturally correct behavior for load and store instructions. The Mbox 150 preferably contains a datastream translation buffer ("DTB") 151, a load queue ("LQ") 152, a store queue ("SQ") 153, and a miss address file ("MAF") 154. The DTB 151 preferably comprises a fully associative translation buffer that is used to store data stream address translations and page protection information. Each of the entries in the DTB 151 can map 1, 8, 64, or 512 contiguous 8-KB pages. The allocation scheme preferably is round robin, although other suitable schemes could also be used. The DTB 151 also supports an 8-bit Address Space Number ("ASN") and contains an Address Space Match ("ASM") bit. The ASN is an optionally implemented register used to reduce the need for invalidation of cached address translations for process-specific addresses when a context switch occurs.

The LQ 152 preferably is a reorder buffer used for load instructions. It preferably contains thirty-two entries and maintains the state associated with load instructions that have been issued to the Mbox 150, but for which results have not been delivered to the processor and the instructions retired. The Mbox 150 assigns load instructions to LQ slots based on the order in which they were fetched from the instruction cache 110, and then places them into the LQ 152 after they are issued by the integer instruction queue 128. The LQ 152 also helps to ensure correct memory reference behavior for the processor.

The SQ 153 preferably is a reorder buffer and graduation unit for store instructions. It preferably contains thirty-two entries and maintains the state associated with store instructions that have been issued to the Mbox 150, but for which data has not been written to the data cache 160 and the instruction retired. The Mbox 150 assigns store instructions to SQ slots based on the order in which they were fetched from the instruction cache 110 and places them into the SQ 153 after they are issued by the instruction cache 110. The SQ 153 holds data associated with the store instructions issued from the integer instruction unit 128 until they are retired, at which point the store can be allowed to update the data cache 160. The LQ 152 also helps to ensure correct memory reference behavior for the processor. The miss address file ("MAF") 154 preferably comprises a 16-entry file that holds physical addresses associated with pending instruction cache 110 and data cache 160 fill requests and pending input/output ("I/O") space read transactions.

Processor 100 preferably includes two on-chip primary-level ("L1") instruction and data caches 110 and 160, and a single secondary-level, unified instruction/data ("L2") cache 180 (FIG. 2b). The L1 instruction cache 110 preferably comprises a 64-KB virtual-addressed, two-way set-associative cache. Prediction of future instruction execution is used to improve the performance of the two-way set-associative cache without slowing the cache access time. Each instruction cache block preferably contains a plurality (preferably 16) instructions, virtual tag bits, an address space number, an address space match bit, a one-bit PALcode bit to indicate physical addressing, a valid bit, data and tag parity bits, four access-check bits, and predecoded information to assist with instruction processing and fetch control.

The L1 data cache 160 preferably comprises a 64-KB, two-way set associative, virtually indexed, physically tagged, write-back, read/write allocate cache with 64-byte cache blocks. During each cycle the data cache 160 preferably performs one of the following transactions: two quadword (or shorter) read transactions to arbitrary addresses, two quadword write transactions to the same aligned octaword, two non-overlapping less-than quadword writes to the same aligned quadword, one sequential read and write transaction from and to the same aligned octaword. Preferably, each data cache block contains 64 data bytes and associated quadword ECC bits, physical tag bits, valid, dirty, shared, and modified bits, tag parity bit calculated across the tag, dirty, shared, and modified bits, and one bit to control round-robin set allocation. The data cache 160 preferably is organized to contain two sets, each with 512 rows containing 64-byte blocks per row (i.e., 32-KB of data per set). The processor 100 uses two additional bits of virtual address beyond the bits that specify an 8-KB page in order to specify the data cache row index. A given virtual address might be found in four unique locations in the data cache 160, depending on the virtual-to-physical translation for those two bits. The processor 100 prevents this aliasing by keeping only one of the four possible translated addresses in the cache at any time.

As will be understood by one skilled in the art, the L2 cache 180 comprises a secondary cache for the processor 100, which typically is implemented on a separate chip. The L2 cache 180 preferably comprises a 1.75-MB, seven-way set associative write-back mixed instruction and data cache. Preferably, the L2 cache holds physical address data and coherence state bits for each block.

Referring now to FIG. 2b, the L2 instruction and data cache control unit ("Cbox") 170 controls the L2 instruction and data cache 190 and system ports. As shown, the Cbox 170 contains a fill buffer 171, a data cache victim buffer 172, a system victim buffer 173, a cache miss address file ("CMAF") 174, a system victim address file ("SVAF") 175, a data victim address file ("DVAF") 176, a probe queue ("PRBQ") 177, a requester miss-address file ("RMAF") 178, a store to I/O space ("STIO") 179, and an arbitration unit 181.

The fill buffer 171 in the Cbox preferably buffers data received from other functional units outside the Cbox 170. The data and instructions get written into the fill buffer 171 and other logic units in the Cbox 170 process the data and instructions before sending to another functional unit or the L1 cache 110 and 160. The data cache victim buffer ("VDF") 172 preferably stores data flushed from the L1 cache 110 and 160 or sent to the System Victim Data Buffer 173. The System Victim Data Buffer ("SVDB") 173 sends data flushed from the L2 cache to other processors in the system and to memory. Cbox Miss-Address File ("CMAF") 174 preferably holds addresses of L1 cache misses. CMAF 174 updates and maintains the status of these addresses. The System Victim-Address File ("SVAF") 175 in the Cbox 170 preferably contains the addresses of all SVDB data entries. Data Victim-Address File ("DVAF") 176 preferably contains the addresses of all data cache victim buffer ("VDF") 172 data entries.

The Probe Queue ("PRBQ") 177 preferably comprises a 18-entry queue that holds pending system port cache probe commands and addresses. The Probe Queue 177 includes 10 remote request entries, 8 forward entries, and lookup L2 tags and requests from the PRBQ content addressable memory ("CAM") against the RMAF, CMAF and SVAF. Requestor Miss-Address Files ("RMAF") 178 in the Cbox 170 preferably accepts requests and responds with data or instructions from the L2 cache. Data accesses from other functional units in the processor, other processors in the computer system or any other devices that might need data out of the L2 cache are sent to the RMAF 178 for service. The Store Input/Output ("STIO") 179 preferably transfer data from the local processor to I/O cards in the computer system. Finally, arbitration unit 181 in the Cbox 170 preferably arbitrates between load and store accesses to the same memory location of the L2 cache and informs other logic blocks in the Cbox and computer system functional units of the conflict.

Referring still to FIG. 2b, processor 100 preferably includes dual, integrated RAMbus memory controllers 190 (Zbox0 and Zbox1). Each Zbox 190 controls 4 or 5 channels of information flow with the main memory 102 (FIG. 1). Each Zbox 190 preferably includes a front-end directory in flight table ("DIFT") 191, a middle mapper 192, and a back end 193. The front-end DIFT 191 performs a number of functions such as managing the processor's directory-based memory coherency protocol, processing request commands from the Cbox 170 and Rbox 200, sending forward commands to the Rbox 200, sending response commands to and receiving packets from the Cbox 170 and Rbox 200, and tracking up to thirty-two in-flight transactions. The front-end DIFT 191 also sends directory read and write requests to the Zbox 190 and conditionally updates directory information based on request type, Local Probe Response ("LPR") status and directory state.

The middle mapper 192 maps the physical address into RAMbus device format by device, bank, row, and column. The middle mapper 192 also maintains an open-page table to track all open pages and to close pages on demand if bank conflicts arise. The mapper 192 also schedules RAMbus transactions such as timer-base request queues. The Zbox back end 193 preferably packetizes the address, control, and data into RAMbus format and provides the electrical interface to the RAMbus devices themselves.

The Rbox 200 provides the interfaces to as many as four other processors and one I/O controller 104 (FIG. 1). The inter-processor interfaces are designated as North ("N"), South ("S"), East ("E"), and West ("W") and provide two-way communication between adjacent processors.

Figure 3:
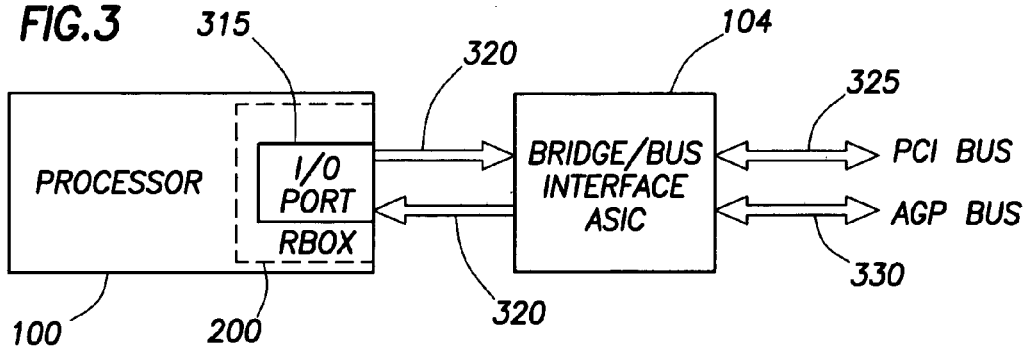
FIG. 3 shows the processor to I/O bridge/Bus Interface ASIC to I/O device physical bus interface.

Referring now to FIG. 3, the I/O port 315 in Rbox 200 within processor 100 is connected through a high speed bus 320 to the I/O bridge/Bus Interface ASIC 104. The I/O bridge ASIC 104 connects through a PCI bus 325 to PCI bus devices and through the AGP bus 330 to advanced graphics port devices.

The I/O bridge ASIC 104 communicates with the processor 100 through the I/O port 315. In the preferred embodiment, message packets transferred between I/O bridge ASIC 104 and the processor are of the same format as processor-to-processor message packets. This simplifies implementation of the processor 100 and I/O bridge ASIC 104 and greatly increases the capabilities of the I/O bridge. Preferably, the I/O bridge ASIC 104 issues and receives a subset of the commands used by the processor 100 for maintaining data coherency (e.g., RdBytes, RdLWs, WrQWs, WrIPR, Fetch, ReadSharedForward, InvaltoDirtyForward, Victim, BlkInval, WrIOAck, WrIONAck, etc.).

Each message packet of the DSM computer system includes a destination ID field identifying the destination processor that the message packet is to go to. If the uppermost bit of the destination ID field is set to 0, the message packet is to go to the destination processor 100 itself. If the uppermost bit of the destination ID field is set to 1, the message packet is to go to the I/O bridge ASIC 104 attached to the destination processor 100. The Rbox of the source processor that generated the message packet replaces the least significant bits of the destination ID field that identify the destination processor 100 with the X/Y coordinates of the destination processor 100 in the DSM computer system.

The I/O port protocol of the preferred embodiment supports DMA read accesses and write accesses of the memory connected to processor 100 by devices connected to the I/O bridge ASIC 104. DMA access of memory connected to remote processors of the DSM computer system is also supported by the I/O port protocol. The I/O port protocol further supports read and write access by the processor to registers in the I/O bridge ASIC 104 and on the I/O buses (PCI bus 325 and AGP bus 330 in FIG. 3) connected to the I/O bridge. Read and write access by the I/O bridge ASIC 104 to system control registers in any processor of the DSM computer system are also supported by the I/O port protocol.

In the preferred embodiment, the I/O bridge ASIC 104 connected to the I/O port 315 of the processor 100 includes a DMA hardware logic device containing a cache buffer that stores copies of memory blocks as well as control logic for performing DMA reads and writes. The DMA device permits I/O devices connected to the I/O bridge ASIC 104 through PCI bus 325 or AGP bus 330 to perform DMA accesses to memory. The DMA device in the I/O bridge ASIC 104 can access data in one of three different ways:

1. A "FetchBlk" request that reads an uncacheable data block from memory.
2. A "ReadMod" request that reads a data block from memory and obtains exclusive ownership of the data block.
3. A "InvaltoDirty" request that obtains exclusive ownership of a data block.

The ReadMod request is used by the I/O bridge ASIC to service read and write requests from an I/O device. A ReadMod request must be used for writes to a section of the data block. The InvaltoDirty request may be used by the I/O bridge ASIC to service an I/O device request to write an entire data block to memory. A data block read exclusively by the I/O bridge ASIC need not be written back to memory by the I/O bridge ASIC because the memory coherence protocol can deterministically update memory with the most recent copy of the data block that was read exclusively by the I/O bridge.

There are two ways to prefetch multiple memory blocks to perform DMA reads depending on the ordering required by the particular I/O device connected to the I/O bridge ASIC 104. The first and most efficient way is to use a stream of non-cacheable fetch commands (FetchBlk). As an example, the I/O bridge ASIC 104 might fetch blocks A and B. In the preferred embodiment, the memory references to blocks A and B may be serviced in any order by the memory system, and responses may return in any order. However, difficulties may occur because memory references are serviced out of order and may return their values out of order. If the references are serviced out of order, this may violate the memory reference ordering constraints required by the DMA read stream for the particular I/O device. If the references return out of order this makes the implementation of the DMA device in the I/O bridge ASIC 104 more difficult because the data may have to be reordered by the I/O bridge ASIC.

The second way to prefetch data in multiple blocks for a DMA read stream is to use ReadMod commands. The advantage of this method is that the I/O device can implement a sequentially consistent read stream because the exclusive access forces order. One disadvantage of using ReadMod commands to prefetch data in multiple blocks is that a VictimClean command must be generated to release exclusive access to the block. The VictimClean command is sent by the I/O bridge ASIC 104 to the home processor of the memory block containing the coherence directory for the memory block. VictimClean informs the home processor that the I/O bridge ASIC 104 has released exclusive access to a clean memory block. The other disadvantage of using ReadMod commands is that exclusive access to the memory block is required. Multiple DMA devices that attempt to access the same memory block at the same time are serialized as a consequence. Similarly, a processor and a DMA device that attempts to access the same memory block at the same time are also serialized.

In the preferred embodiment, two ways to prefetch data in multiple blocks for a DMA write stream exist. The first way is by the use of a stream of ReadMod commands. The second way to perform DMA writes for multiple blocks is by the use of a stream of InvaltoDirty request commands. The Invalto-Dirty commands require that whole blocks of memory be written to.

Preferably, the I/O port protocol allows InvaltoDirty commands to be issued speculatively from the DMA device in an I/O bridge ASIC 104 for multiple block writes since the main memory of the home processor contains a prior copy of the block. Thus, if the speculative InvaltoDirty command to perform a DMA write to a memory block is found to be a misspeculation, the I/O bridge ASIC 104 can issue a VictimClean command to back out of the DMA write request. Also, in the preferred embodiment the I/O port protocol is implemented so that the DMA device will never receive dirty memory blocks (i.e., containing data different from the memory block's stored data in the home processor) in response to a ReadMod. This means Victim commands (writing a memory block back to home processor because it was dirtied/written to) are never needed for a DMA read stream using ReadMod commands.

The DMA device in the I/O bridge ASIC 104 that uses ReadMod or InvaltoDirty requests to access data described above gains exclusive ownership of memory blocks stored in the DMA device cache buffer of the I/O bridge ASIC 104. Exclusive caching and timeouts are two techniques used to maintain coherency of these memory blocks and resolve competing requests for the memory block across the DSM computer system.

When DMA accesses are performed using exclusive caching, the DMA device in the I/O bridge ASIC 104 is expected to force the eviction of a cache block soon after receiving a request for the cache block. The cache buffer in the DMA device of the I/O bridge ASIC 104 may exclusively cache copies of memory blocks for long periods of time. If a processor or another I/O bridge ASIC requests a copy of the block stored in the cache buffer, the home processor determines that I/O bridge ASIC 104 is the exclusive owner of the memory block and forwards the request to the I/O bridge ASIC 104. Because of the preferred embodiment of the I/O port protocol, the home processor containing the coherence directory for the memory block expects to eventually receive both a ForwardMiss and a Victim or VictimClean in response.

When using exclusive caching to perform DMA accesses to processor system memory, the DMA device in I/O bridge ASIC 104 should respond ForwardMiss to every request received for the memory block and also perform the following actions:
  Any currently cached memory blocks that could possibly match the address in the request for the memory block must be marked for eventual eviction.
  Any currently pending MAF entries that could possibly match the address in the request for the memory block must be marked so that the block eventually gets evicted after it returns.

The I/O bridge ASIC 104 receiving a forwarded request for the memory block does not imply that the I/O bridge ASIC 104 currently holds a copy of the memory block. In one scenario, a Victim command may be on its way from the I/O bridge ASIC 104 to the home processor containing the coherence directory for the memory block before the I/O bridge ASIC 104 receives the forwarded request for the memory block.

Another technique used by the I/O bridge ASIC 104 to perform DMA accesses that guarantee coherency of the memory block and resolve competing requests for the memory block is by the use of timeouts. When using timeouts, the DMA device in the I/O bridge ASIC 104 evicts memory blocks soon after becoming the exclusive owner of the memory block based on the expiration of a timer. This technique allows the I/O bridge ASIC 104 to ignore forwarded requests for the memory block. Thus, when using this mode to perform DMA accesses to processor system memory, the I/O bridge ASIC 104 should respond ForwardMiss to every request received for the memory block and otherwise ignore the request.

Figure 4:
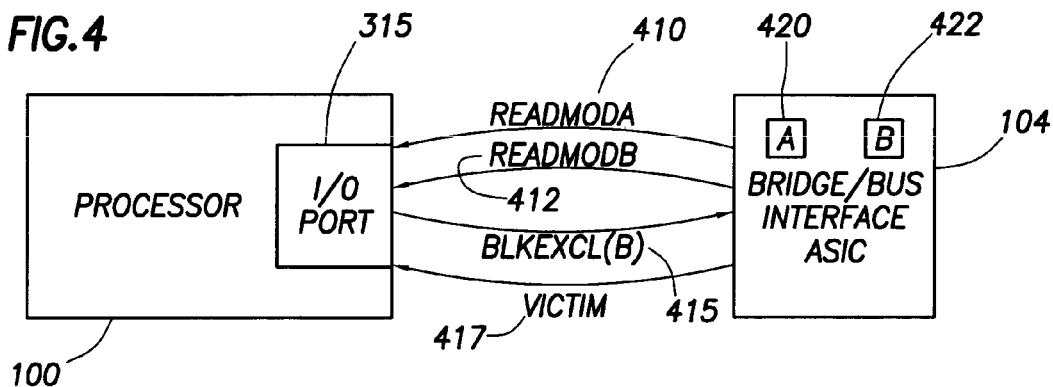
FIG. 4 shows one scenario in which the I/O bridge/Bus Interface ASIC needs to flush its internal cache buffer to prevent a deadlock from occurring in the DSM computer system.

The DMA device in I/O bridge ASIC 104 that does not implement timeouts and ignores requests for data that it has cached can cause deadlocks when different processors request the same memory block. One scenario shown in FIG. 4 that may cause deadlock occurs when a DMA device in the I/O bridge ASIC 104 requests exclusive access to memory block A (ReadModA 410) and memory block B (ReadModB 412) simultaneously. Due to ordering rules, suppose the DMA device must first write to memory block A and then write to memory block B. Next, the response for memory block B returns (BlkExcl(B) 415) but cannot be written because of ordering rules. Suppose another processor or I/O bridge ASIC device wants to reference memory block B, so the home processor for memory block B sends a request to I/O bridge ASIC 104 to release the memory block. The DMA device in I/O bridge ASIC 104 has two options:
  1. Hold onto memory block B until memory block A returns, then write to memory block A and memory block B and release both of them.
  2. Release memory block B before memory block A returns.

Option 1 may cause deadlock if the memory block for A cannot be returned until memory block B is released. One situation where the memory block for A cannot be returned until memory block B is released is when the ReadModA is stuck in the computer network behind the ReadModB request from the other processor or I/O bridge ASIC device. Thus, the ReadModA cannot get processed until the ReadModB from the other processor or I/O bridge ASIC device is processed.

In one embodiment, to remedy deadlock situations as described above a timer is used to decide when to release memory block B. Thus, because of the implementation of the I/O port protocol in this embodiment the DMA device in I/O bridge ASIC 104 responds with a ForwardMiss to the request for memory block B and uses a timer to decide when to release memory block B. When the timer expires, the DMA device actually releases memory block B by sending either a Victim 417 or VictimClean message to the requesting processor or I/O bridge ASIC. This preferred embodiment avoids deadlock but gives I/O bridge ASIC 104 the opportunity to hold onto memory block B until it can actually complete the write to memory block B.

In a second embodiment, to remedy the deadlock situation described above when the DMA device in the I/O bridge ASIC 104 receives the request for memory block B, after responding with a ForwardMiss, it releases memory block B with a Victim 417 or VictimClean message to the requesting processor or I/O bridge ASIC.

Another operation supported by the I/O port protocol is read/write access by the processor 100 to registers in the I/O bridge ASIC 104 and on I/O buses 325 and 330 connected to the I/O bridge ASIC 104. Read/write access by the processor 100 to the registers in the I/O bridge ASIC 204, and on the PCI bus 325 and AGP bus 330 connected to the I/O bridge ASIC 104, allow the processor 100 to control the I/O devices connected to the I/O port 315 through the I/O bridge ASIC 104. The processor 100 implements a large number of logical channels that are mapped to actual physical channels. In the preferred embodiment, the memory and I/O bridge ASIC coherence protocol is implemented such that the I/O bridge ASIC 104 may stall read/write accesses to registers in the I/O bridge ASIC 104 pending completion of DMA references in such a way that the system will not deadlock.

The I/O bridge ASIC 104 can reference read/write system registers of any of the processors in the DSM computer system. This allows for system registers in any processor to be configured by the I/O bridge ASIC 104, or an I/O device connected to PCI bus 325 and AGP bus 330. The capability of I/O bridge ASIC 104 to read/write system registers allows an I/O device to generate interrupts that are delivered from the I/O device to a processor (described in greater detail below). Interrupt references must never block either a DMA access or I/O system register access by the processor or deadlock may occur.

In the preferred embodiment of the I/O port protocol, the processor maintains the following I/O memory space ordering rules:
  Sequential Loads ("Load-Load") ordering is maintained to the same I/O bridge ASIC or processor.
  Sequential Stores ("Store-Store") ordering is maintained to the same I/O bridge ASIC or processor.
  Load-Store or Store-Load ordering is maintained to the same memory address.
  Load-Store or Store-Load ordering is not maintained when the memory addresses are different.

These ordering constraints apply to a single processor communicating with one I/O bridge ASIC or processor. Multiple Loads to the same or different addresses simultaneously execute without waiting for the first Load to complete, with ordering being maintained to the destination by the Cbox and the Rbox. Similarly, ordering is maintained when multiple Stores to the same or different address simultaneously execute without waiting for the first Store to complete.

Preferably, if a Load instruction from address A is executing, the processor will not launch a Store to address A until a BlkIO response to the Load instruction is received. A BlkIO response occurs after the data from address A is transmitted to the processor. The processor may have an earlier Store instruction request to address B executing at the same time as there are Load requests executing to retrieve data from address B. The Cbox and Rbox guarantee that the earlier Store instruction request reaches the destination before the later Load requests.

An I/O bridge ASIC 104 may send a Read or Write message to another I/O bridge ASIC to implement peer-to-peer communication between two or more software programs executing on two different processors. In the preferred embodiment, because of the ordering constraints of the I/O port protocol, Writes must be able to bypass prior Reads to avoid deadlock between I/O bridge ASICs performing peer-to-peer communication. This is required because Read responses cannot be returned until prior Writes are completed to maintain the ordering constraints. By allowing the Writes to bypass Reads, the Writes are guaranteed to eventually complete, thereby guaranteeing that Reads will eventually complete.

In order to implement the I/O memory space ordering requirements, the processor Rbox must maintain the rules listed in Table 1.

TABLE 1

Router Ordering Rules

| First Instruction | Second Instruction | Ordering Rule |
|---|---|---|
| Rd* | Rd* | Order Must be Maintained |
| Rd* | Wr* | The later Wr* must be allowed to bypass the earlier Rd* to avoid deadlock |
| Wr* | Rd* | Order must be maintained |
| Wr* | Wr* | Order must be maintained |

Thus, except for the case of a Read followed by a Write, total order must be maintained. In the preferred embodiment, the processor does not support instruction references to I/O device memory space because the processor cannot execute code received directly from the I/O bridge ASIC. Code residing in I/O device memory space must first be copied into main memory before it can be directly executed.

All I/O Write instructions preferably are acknowledged. The processor waits at a memory barrier for a write acknowledgement before proceeding. The processor also waits at a memory barrier for the response to an I/O Read request before proceeding.

No ordering constraints are present between I/O accesses that reference different I/O bridge ASICs or processors. Similarly, no ordering constraints are present between I/O accesses that are requested by different processors or I/O bridge ASICs. That is, the ordering rules apply only with the same source and destination for a reference to an I/O device or registers in a processor or I/O bridge ASIC. If I/O accesses reference different I/O bridge ASICs or processors, then memory barriers implemented using IOACK messages must be used to order the I/O accesses. In this case, when the initial target memory of a stream of I/O Write instructions is memory space in which no memory coherence is maintained but then later changes to target memory space in which memory coherence is maintained or a different target memory in non-coherent memory space, an IOACK message is necessary to insure all frames of reference in the computer system observe the memory transactions in the same order.

In the preferred embodiment of the I/O port protocol, coherence of I/O TLB entries is not explicitly supported, but I/O TLB coherence can be maintained by hardware exclusive caching of the I/O TLB entries. Thus, the I/O bridge ASIC simply caches the data blocks that contain the TLB entries. IF a forward request message arrives, the I/O bridge ASIC flushes the TLB entries from its cache.

In the preferred embodiment of the I/O port protocol, the I/O bridge ASIC can cache data blocks as described above. However, because the I/O port protocol is a subset of the memory and cache coherence protocol, no invalidations of shared copies of data blocks are required.

Figure 5:
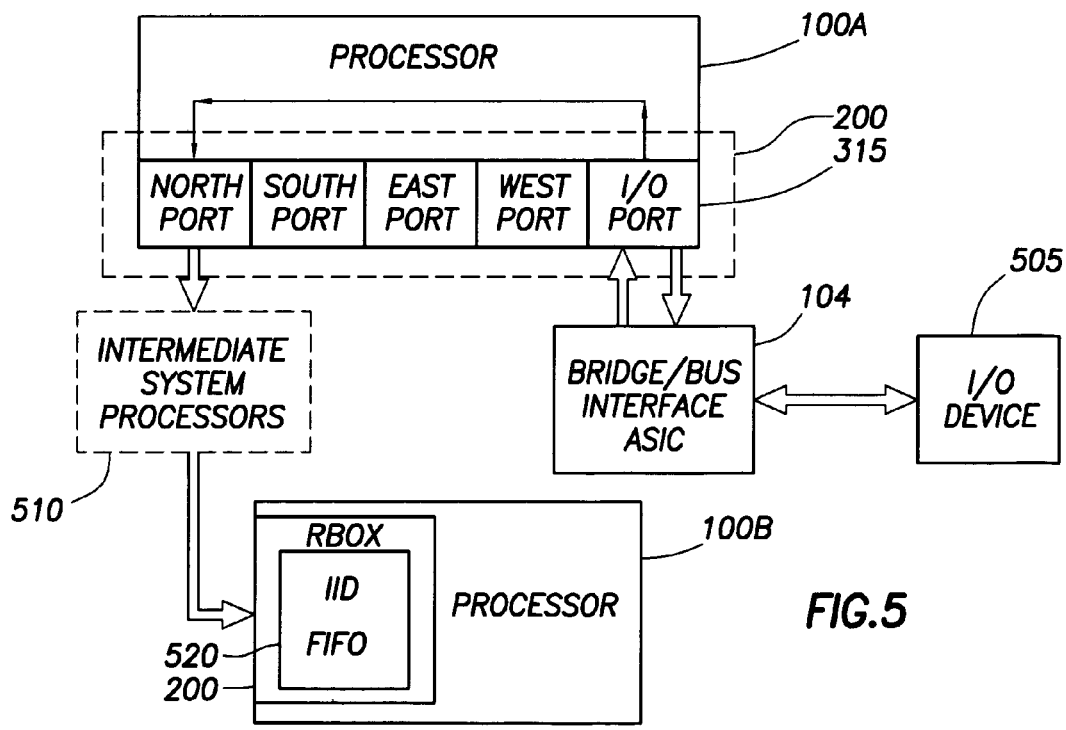
FIG. 5 shows an interrupt scheme implemented for I/O port devices using the I/O port protocol.

Turning now to FIG. 5, one preferred embodiment for the processing of an interrupt from an I/O device 505 connected through PCI bus 325 to an I/O bridge ASIC 104 of processor 100A in the DSM computer system is shown. An interrupt generated by the I/O device 505 is delivered to processor 100B by the I/O bridge ASIC 104 preferably using message packets under the I/O port protocol. The I/O bridge ASIC 104 sends the interrupt request in a message packet through I/O port 315 of the Rbox 200 in the processor 100A connected to the I/O bridge ASIC 104. As shown in FIG. 5, for this example the message packet based on routing information in the header is routed through the north port of the processor 100A. The message packet is then routed through intermediate system processors 510 until the message packet eventually reaches the destination processor 100B that the interrupt request was sent to.

The message packet containing the interrupt generated by the I/O device connected to I/O bridge ASIC 104 is stored in FIFO queue 520 in the Rbox 200 of the destination processor 100B. Each interrupt message packet contains a unique interrupt ID ("IID") that is stored in the FIFO queue 520. Preferably, the IID is a 24-bit identifier that can uniquely identify the source of the interrupt. Interrupt software reads the top of the FIFO queue to determine how to process the interrupt. The processor 100B and I/O devices access this FIFO queue by means of references to interrupt queue registers in the processor.

I/O devices connected to the I/O bridge ASIC 104 typically queue the IID in an I/O device queue prior to transmitting the message packet containing the interrupt. An I/O device queue is needed to store interrupt message packets in case the FIFO queue 520 in destination processor 100B has overflowed. Thus, if the I/O device 505 generates an interrupt by issuing a Write to an interrupt queue register in a destination processor 100B, the I/O device must be prepared to receive a WrION-Ack response indicating that the destination processors FIFO interrupt queue has overflowed. When the I/O bridge ASIC connected to the I/O device receives the overflow response, it resends the interrupt again to the same or another processor until it is accepted.

In the preferred embodiment, one processor can generate interrupts for another processor by issuing a Write that sets a mask bit in a RBOX_INT register of the destination processor. Interprocessor interrupts typically do not use an interrupt queue because there is no hardware mechanism to determine when the interrupt queue overflows.

Preferably, each processor contains six interrupt input lines IRQ(0)-IRQ(5). The processor partitions interrupt sources onto these six lines as given in Table 2 below:

TABLE 2

| Interrupt Sources Mapped To Interrupt Lines | |
|---|---|
| Interrupt Level | Source |
| IRQ (0) | System correctable/performance count |
| IRQ (1) | Interrupt queue |
| IRQ (2) | Interval timer |
| IRQ (3) | Other (e.g. interprocessor/SW ALERT) |
| IRQ (4) | Halt interrupt/other |
| IRQ (5) | Uncorrectable/machine check/HW ALERT |

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A distributed multiprocessing computer system, comprising:
a plurality of processors each coupled to an I/O bridge;
a plurality of memory modules coupled one each to the plurality of processors, each memory module able to store data blocks that are shared between said processors, wherein coherence of the shared data blocks is maintained using a directory based coherence protocol;
at least one I/O device coupled to the I/O bridge, the I/O device and I/O bridge performs direct memory access (DMA) to transfer data blocks to the memory modules; and
wherein the I/O bridge obtains exclusive ownership of shared memory module data blocks during I/O device access, and wherein said I/O bridge includes a DMA device configured to perform both in-order and out-of-order DMA reads and writes on streams of data blocks, the DMA device that performs an in-order stream of reads of data blocks always receiving coherent data blocks that do not have to be written back to the memory module.

* * * * *

UNITED STATES PATENT AND TRADEMARK OFFICE
CERTIFICATE OF CORRECTION

PATENT NO.         : 8,364,851 B2
APPLICATION NO.    : 10/677583
DATED              : January 29, 2013
INVENTOR(S)        : Richard E. Kessler et al.

Page 1 of 1

It is certified that error appears in the above-identified patent and that said Letters Patent is hereby corrected as shown below:

In the Specifications:

In column 1, line 3, below "PROTOCOL"
                CROSS-REFERENCE TO RELATED
                        APPLICATIONS This application relates to the following commonly
insert -- assigned co-pending applications entitled: --.

In column 1, line 21, delete "Keep-All" and insert -- All --, therefor.

In column 1, lines 63-67, below "Not applicable."
                CROSS-REFERENCE TO RELATED
                        APPLICATIONS This application relates to the following commonly
delete "assigned co-pending applications entitled:".

Signed and Sealed this
Seventh Day of May, 2013

Teresa Stanek Rea
*Acting Director of the United States Patent and Trademark Office*